United States Patent
Chao (10) Patent No.: US 7,144,238 B2
(45) Date of Patent: Dec. 5, 2006

(54) SERVO MOTOR CONTROL APPARATUS FOR ELECTRIC INJECTION MOLDING MACHINE

(75) Inventor: Chin-Yu Chao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 514 days.

(21) Appl. No.: 10/782,912

(22) Filed: Feb. 23, 2004

(65) Prior Publication Data

US 2005/0129794 A1    Jun. 16, 2005

(30) Foreign Application Priority Data

Dec. 12, 2003    (TW) .............................. 92135118 A (51) Int. Cl.
*B29C 45/80* (2006.01)
(52) U.S. Cl. ..................... 425/145; 425/150
(58) Field of Classification Search ............. 425/145, 425/150
See application file for complete search history.

(56) References Cited

U.S. PATENT DOCUMENTS

| | | | |
|---|---|---|---|
| 4,735,564 A * | 4/1988 | Sasaki et al. | 425/145 |
| 4,820,464 A * | 4/1989 | Sasaki et al. | 425/150 |
| 5,362,222 A * | 11/1994 | Faig et al. | 425/145 |
| 6,046,566 A | 4/2000 | Sonoda et al. | |
| 6,142,760 A | 11/2000 | Niizeki et al. | |

* cited by examiner

*Primary Examiner*—Tim Heitbrink
(74) *Attorney, Agent, or Firm*—Rabin & Berdo, P.C.

(57) ABSTRACT

A servo motor control apparatus comprises a motion control unit for generating a position command; a first drive amplifier connecting with the motion control unit, for receiving the command to drive a first servo motor, and forming a first position control loop together with the motion control unit and the first servo motor; and at least one second drive amplifier connecting with the motion control unit, for receiving the command to drive at least one second servo motor, and forming a second position control loop together with the motion control unit and the second servo motor. The motion control unit comprises at least one synchronous controller, which receives and performs calculations to a difference value between position errors of the first and second position control loops for serving as speed and torque feed forward compensations to keep said second servo motor synchronous with the first servo motor.

11 Claims, 7 Drawing Sheets

SERVO MOTOR CONTROL APPARATUS FOR ELECTRIC INJECTION MOLDING MACHINE

BACKGROUND OF THE INVENTION

1. Field of the Invention

The present invention relates generally to servo motor control devices for electric injection molding machine, and more particularly, to a servo motor control apparatus for an electric injection molding machine having synchronous function.

2. Description of the Related Art

Figure 3:
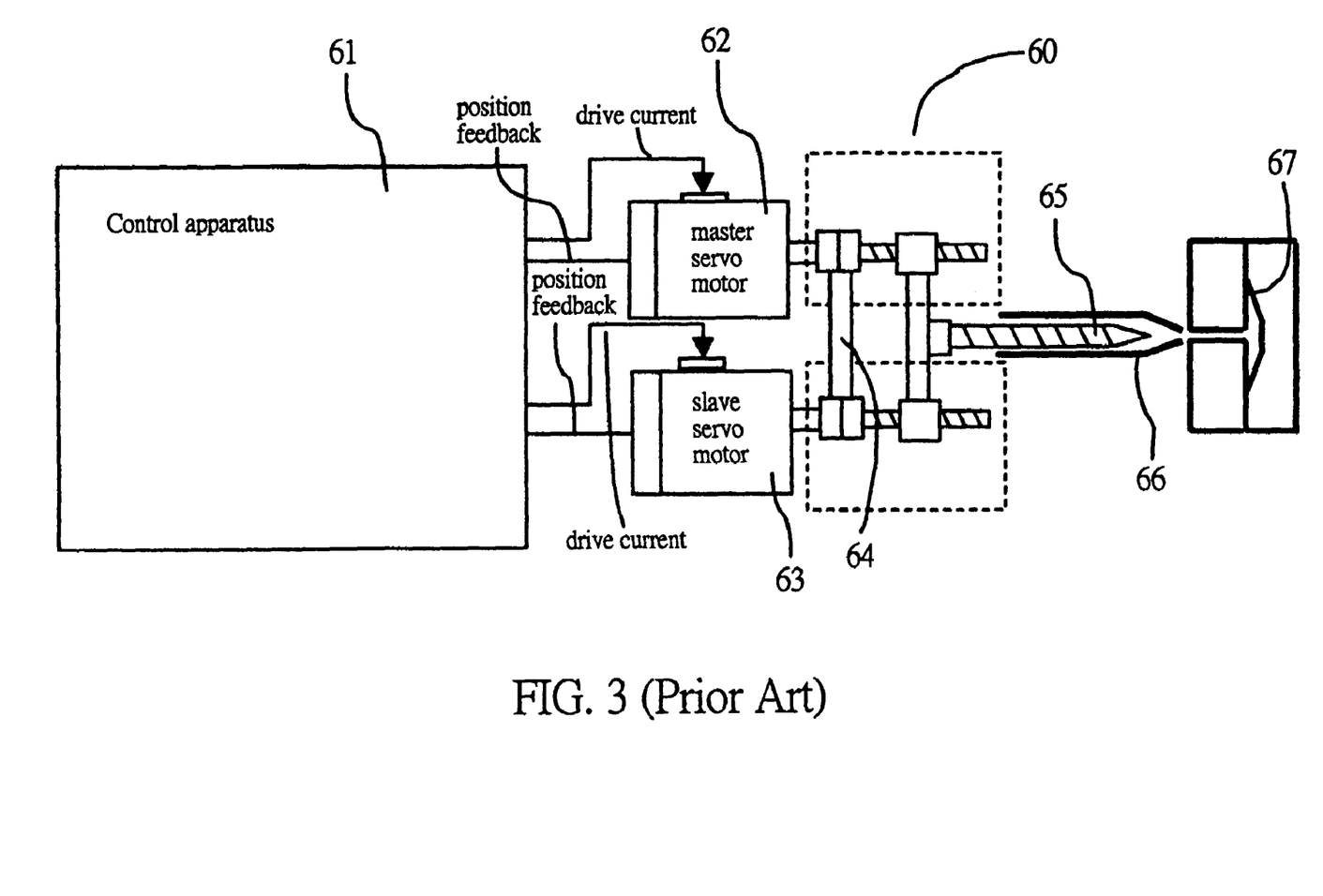
FIG. 3 is a schematic diagram showing an outline construction of an electric injection molding machine.

In general, electric injection molding machine employs a single servo motor as drive source for injection molding. For a large scale electric injection molding machine which requires a large output power, the method of upgrading the output power of the single servo motor usually gives rise to the problems of increasing the costs and complicating the manufacture process. Accordingly, in practice, a plurality of small output power servo motors are employed in parallel to cooperatively drive the injection screw of the electric injection molding machine, which achieves an identical effect with the employing of a large output power servo motor. Referring to FIG. 3, which illustrated a schematic diagram showing an outline construction of an electric injection molding machine, wherein a servo motor control apparatus 61 controls and drives a master servo motor 62 and at least one slave servo motor 63. Mechanical connecting means, for example a belt 64, is employed to interconnect the master servo motor 62 and the slave servo motor 63 for synchronously driving an injection screw 65, further injecting melted resin in a barrel 66 to a cavity 67 for molding.

Figure 4:
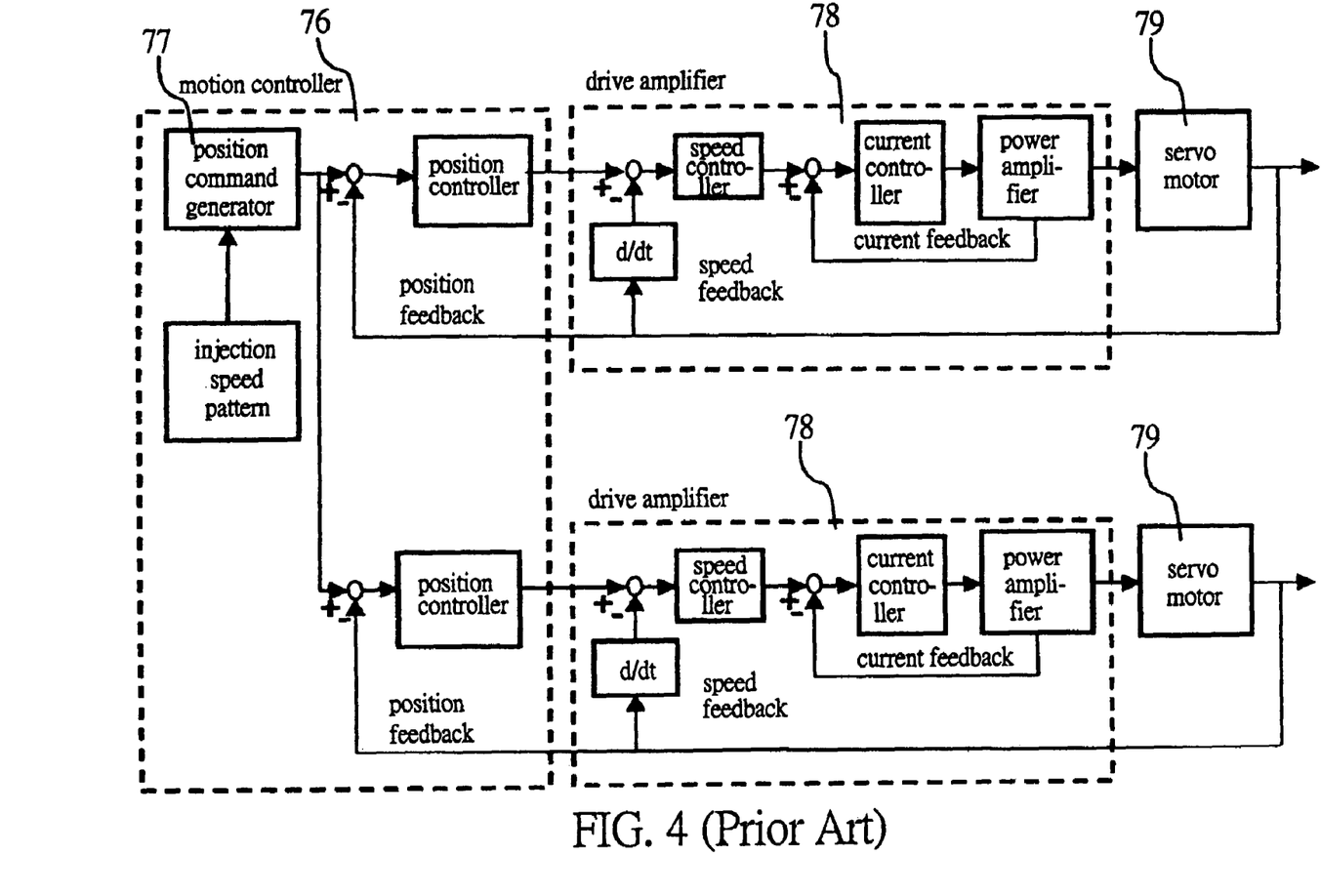
FIG. 4 is an inner function block diagram of a conventional servo motor control apparatus.

Consequently, how to well design the control apparatus 61 to thereby control the synchronous operation of the plurality of servo motor 62, 63 and reduce the problems of interference and vibration caused by non synchronous operation, has become a key step for improving the function of the large scale electric injection molding machine 60. Many conventional technologies has brought forward different control apparatus for improving the injection effect. Referring to FIG. 4, which illustrates an inner function block diagram of a conventional servo motor control apparatus, wherein the conventional servo motor control apparatus employs a most basic control method that employs a position command generator 77 in a motion controller 76 to generate a position command, wherein the same command synchronously drives two drive amplifiers 78 and their corresponding servo motors 79, in which, the servo motors 79 are parallel to one another, and no master or slave servo motor are defined. However, using the same position command for synchronously controlling fails to achieve an accurate synchronous effect due to many variable factors that may affect the rotation of the servo motors, such as the electrical parameters difference of different servo motors, the friction between different mechanisms, the frictional resistance in different positions or the different characters of the new components and the old ones. Hence, even if different servo motors are being actuated with the same position command, it may still result in a non synchronous outcome due to the aforementioned factors. Further, when said conventional servo motor control apparatus is used, a mechanical connecting means, for example a belt, must be employed to the output shaft of the two servo motors for diminishing the difference of the rotation angular positions between the two servo motors 79. Thus the unreliable synchronous effect may chance to induce interference and damage to the mechanical connecting means.

Figure 5:
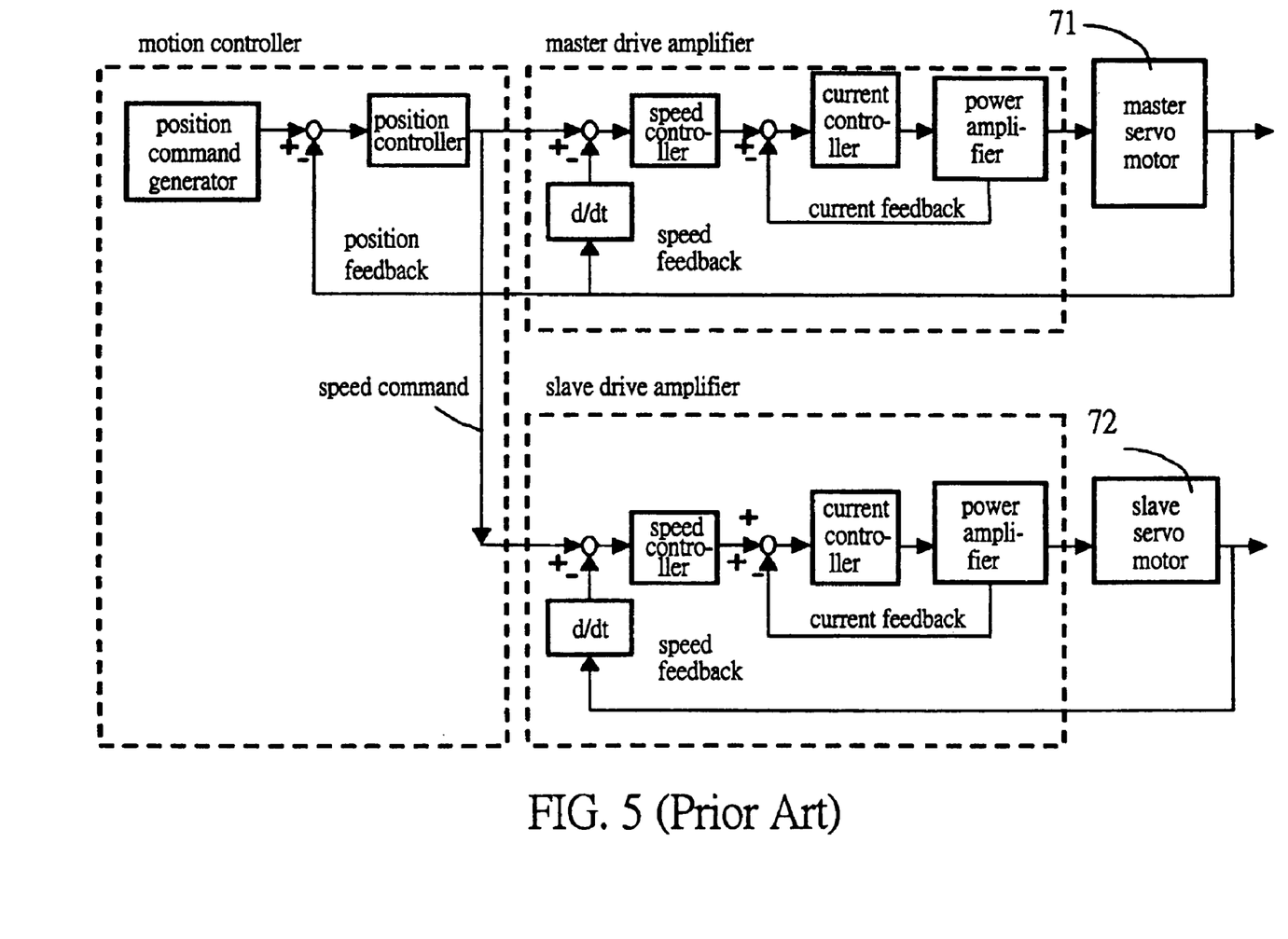
FIG. 5 is an inner function block diagram of another conventional servo motor control apparatus.

Referring to FIG. 5, an inner function block diagram of another conventional servo motor control apparatus is shown. Said conventional servo motor control apparatus controls a master servo motor 71 via a position command, while the master servo motor 71 controls a slave servo motor 72 via a speed command. Said conventional servo motor control apparatus is configured such that the slave servo motor 72 is synchronously controlled in accordance with the rotation speed of the master servo motor 71. However, the problem of mechanical connecting means, for instance, a belt employed to connect the master drive mechanism and the slave drive mechanism, which may induce system hunting because of external disturbance, still exists in said conventional servo motor control apparatus.

Figure 6:
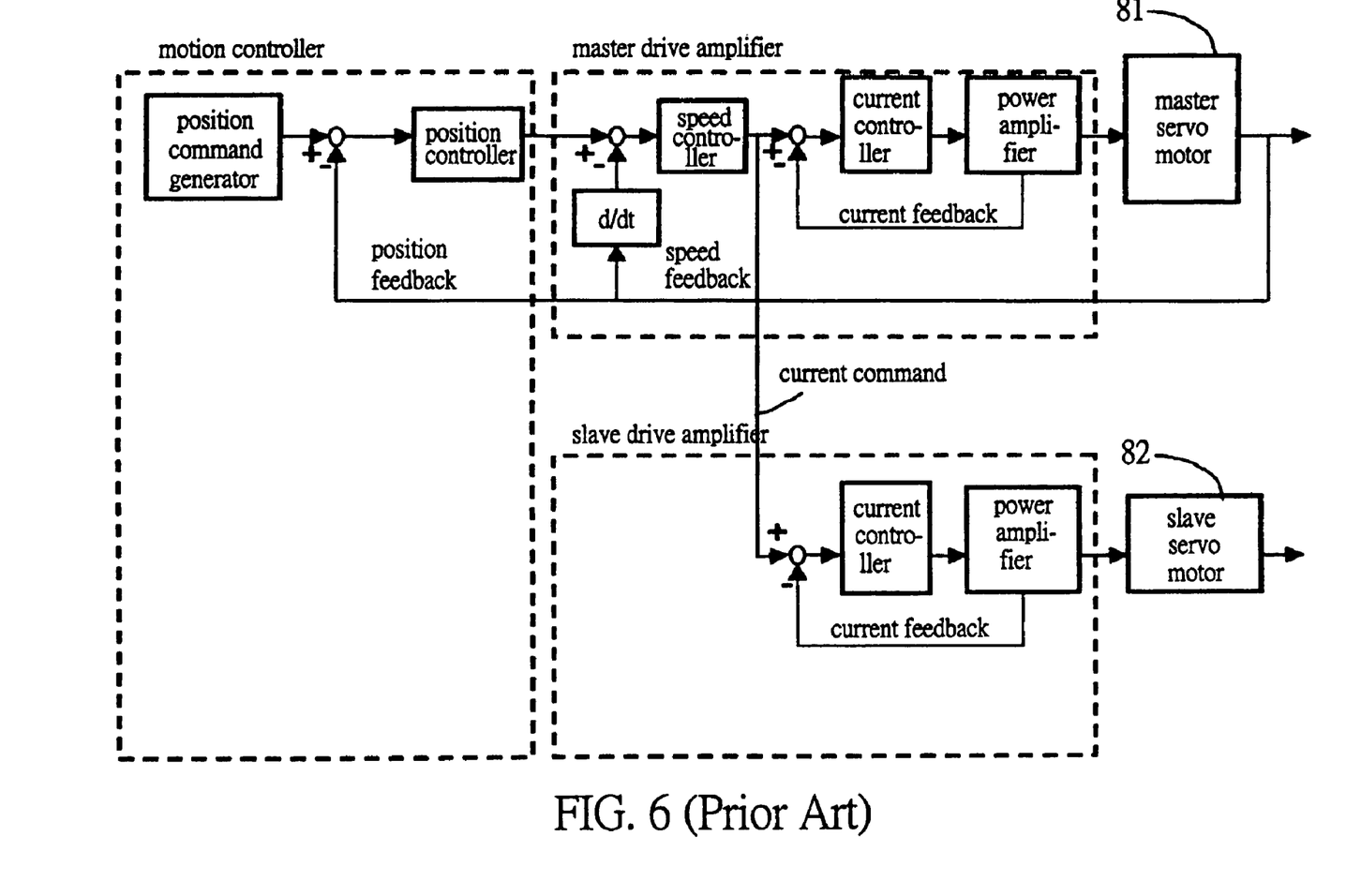
FIG. 6 is an inner function block diagram of a servo motor control apparatus disclosed in U.S. Pat. No. 6,142,760.

Referring to FIG. 6, U.S. Pat. No. 6,142,760 which discloses a control apparatus. The control apparatus controls a master servo motor 81 via a position control mode, while the master servo motor 81 controls a slave servo motor 82 via a torque control mode, thereby driving the slave servo motor 82 synchronously with the master servo motor 81 to improve the problem of system hunting. However, non synchronous effect caused by different frictional resistance may occur in said control apparatus, for example, in the case of the master servo motor 81 increases the torque output thereof in response to a large frictional resistance, while the slave servo motor 82 which does not suffer frictional resistance also increase its torque output in response to the action of the master servo motor 81, thus the rotation speed of the slave servo motor 82 is greater than that of the master servo motor 81. As a result, the mater servo motor 81 can not synchronously cooperate with the slave servo motor 82, which likely induces interference and damage to the mechanical connecting means of the two servo motors.

Figure 7:
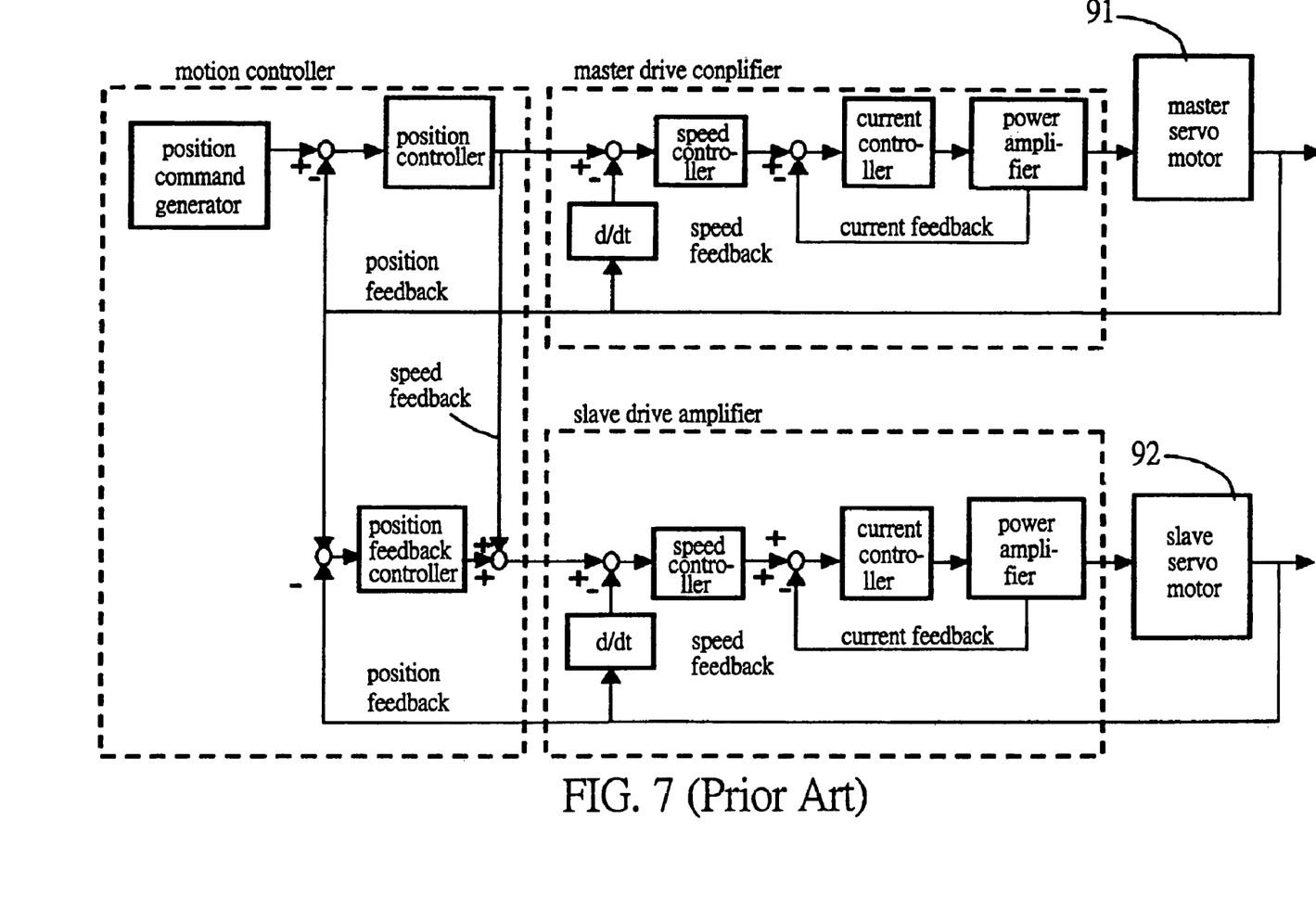
FIG. 7 is an inner function block diagram of a servo motor control apparatus disclosed in U.S. Pat. No. 6,046,566.

Additionally, FIG. 7 illustrates an inner function block diagram of another servo motor control apparatus disclosed in U.S. Pat. No. 6,046,566. The servo motor control apparatus controls a master servo motor 91 via position control mode, and controls a slave servo motor 92 via speed control mode. The speed command of the slave servo motor comes from the speed of the master servo motor 91. A feedback of synchronous error adjusting is incorporated into the servo motor control apparatus for achieving a better synchronous adjusting effect. However, the problem of mechanical connecting means mentioned above still exists in this servo motor control apparatus, and what's more, the response speed of the synchronous adjusting is somewhat slow, which delays the synchronous adjusting of the slave servo motor 92, and can not satisfy the requirement of the synchronous drive efficiency.

Thus, how to develop a servo motor control apparatus for electric injection molding machine to synchronously control the rotation speed of multiple servo motors, thereby achieving an improved accumulative effect, simultaneously achieving a fast synchronous response and reducing vibration friction, has become an urgent task in this field.

SUMMARY OF THE INVENTION

The primary objective of the present invention is to provide a servo motor control apparatus for electric injection molding machine, which synchronously controls the rotation speed of multiple servo motors.

Another objective of the present invention is to provide a servo motor control apparatus for electric injection molding machine, which achieves an efficient driving effect for the loads.

And yet another objective of the present invention is to provide a servo motor control apparatus for electric injection molding machine, which has an output accumulation effect of multiple servo motors.

And still another objective of the present invention is to provide a servo motor control apparatus for electric injection molding machine, which does not employ mechanical connecting means and does not induce vibration.

A further objective of the present invention is to provide a servo motor control apparatus for electric injection molding machine, which has a fast synchronous response.

And still a further objective of the present invention is to provide a servo motor control apparatus for electric injection molding machine, which is applicable to different frictional resistance for synchronously adjusting.

In accordance with the above and other objectives, the present invention proposes a servo motor control apparatus for electric injection molding machine. The servo motor control apparatus includes a motion control unit, a first drive amplifier and at least one second drive amplifier. The motion control unit is used for generating a position command. The first drive amplifier connects to the motion control unit for receiving the position command of the motion control unit to drive a first servo motor; the first drive amplifier, the motion control unit and the first servo motor cooperatively form a first position control loop. The second drive amplifier connect to the motion control unit for receiving the position command of the motion control unit to drive at least one second servo motor; the second drive amplifier, the motion control unit and said second servo motor cooperatively forms a second position control loop. The motion control unit comprises at least one synchronous controller, the synchronous controller is used to produce a difference between a position error of the first position control loop and a position error of the second position control loop, allowing the synchronous controller to use the speed feed forward compensation and a torque feed forward compensation to adjust the second servo motor and to keep the second servo motor synchronous in rotation speed with the first servo motor.

The aforementioned synchronous controller performs a filtering compensation calculation to the difference between the position error of the first position control loop and the position error of the second position control loop, for achieving a speed compensation value of the second drive amplifier to adjust the rotation speed of the second servo motor. The synchronous controller further performs a differential calculation to the speed compensation value, for achieving a torque compensation value of the second drive amplifier to adjust the rotation angular position of the second servo motor, thereby accelerating the synchronous respond speed.

In addition, the position error of the first position control loop is achieved via the position command generated by the motion control unit subtracts a position feedback value of the first position control loop; the position error of the second position control loop is achieved via the position command generated by the motion control unit subtracts a position feedback value of the second position control loop; and the position command generated by the motion control unit is a predetermined motion potion arrangement of an injection screw of the electric injection molding machine.

Consequently, by adopting the synchronous control loop of the synchronous controller and the second servo motor, the second servo motor is adjusting to be synchronous with the first servo motor, and by the conversion of the drive mechanisms, the drive load speeds of the first and second servo motors are adjusted to be uniform and the drive load torques of the first and second servo motors are accumulated, thereby avoiding the interference and damage to the servo motors caused by non synchronous rotation speeds of the servo motors, further accelerating the synchronous respond speed to eliminate the impact of vibration friction.

BRIEF DESCRIPTION OF THE DRAWINGS

The drawings included herein provide a further understanding of the invention. A brief description of the drawings is as follows.

DETAILED DESCRIPTION OF THE PREFERRED EMBODIMENT

Figure 1:
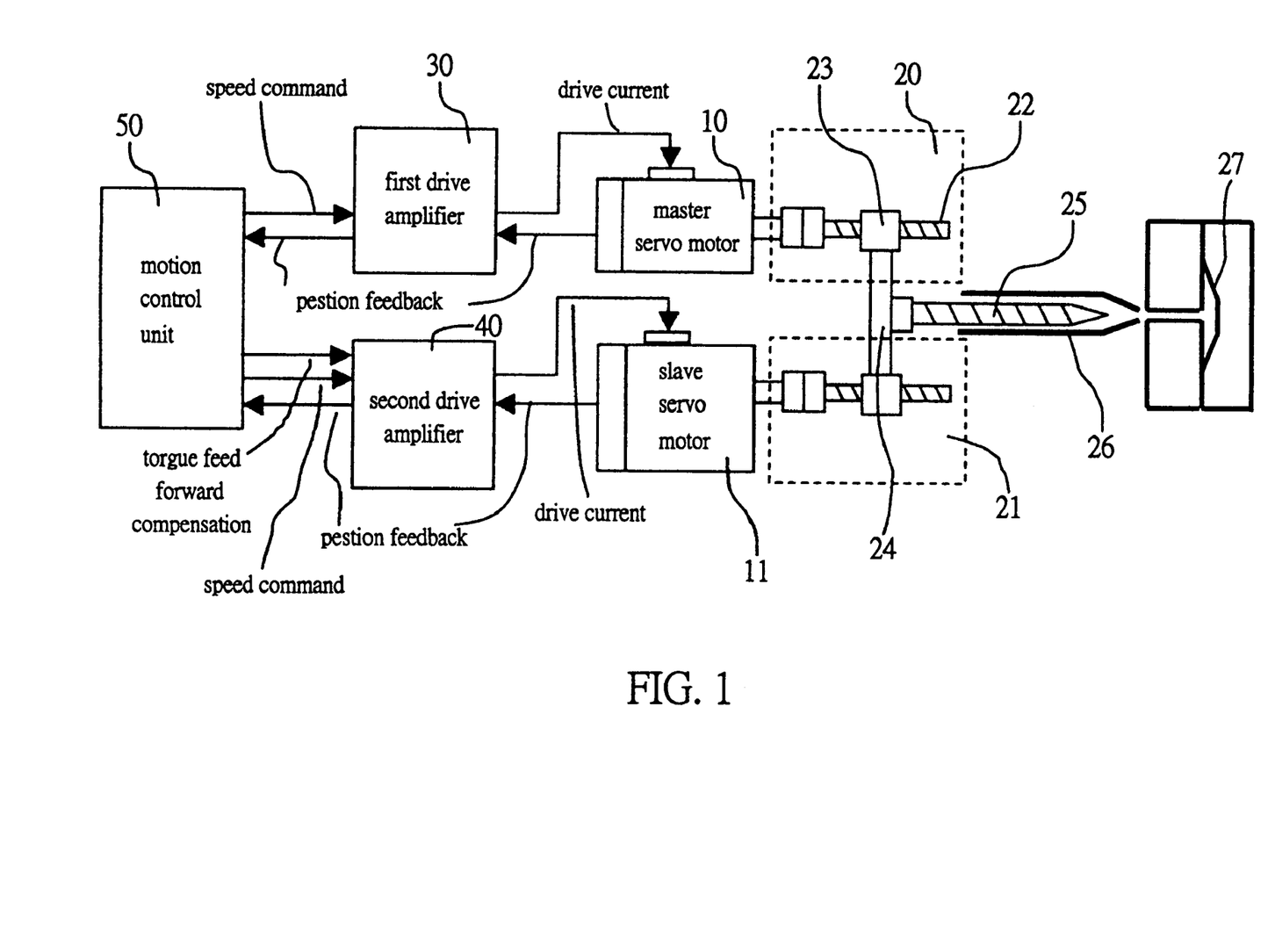
FIG. 1 is a schematic diagram of a servo motor control apparatus in accordance with one preferred embodiment of the present invention applied to an electric injection molding machine.

Referring to FIG. 1, a servo motor control apparatus applied to an electric injection molding machine is shown. The servo motor control apparatus controls the servo motors of the electric injection molding machine and drives a drive mechanism and an injection screw thereof for injection molding. In general, the electric injection molding machine comprises a master servo motor 10 and at least one slave servo motor 11 to respectively drive a master drive mechanism 20 and at least one slave drive mechanism 21. The nut 23 of the ball screw 22 of the master drive mechanism 20 and slave drive mechanism 21 are connected by a rigid body 24 to cooperatively drive an injection screw 25 of the electric injection molding machine. Melted resin stored in a barrel 26 is injected into a cavity 27 for injection molding. Accordingly, the servo motor control apparatus of the present invention comprises a first drive amplifier 30 and a second drive amplifier 40 to respectively drive the master servo motor 10 and slave servo motor 11; a motion control unit 50 for controlling the first drive amplifier 30 and the second drive amplifier 40. The servo motor control apparatus of the present invention is constructed such that a first position control loop cooperatively defined by the motion control unit 50, the first drive amplifier 30 and the master servo motor 10; and a second position control loop cooperatively defined by the motion control unit 50, the second drive amplifier 40 and the slave servo motor 11 are formed.

Figure 2:
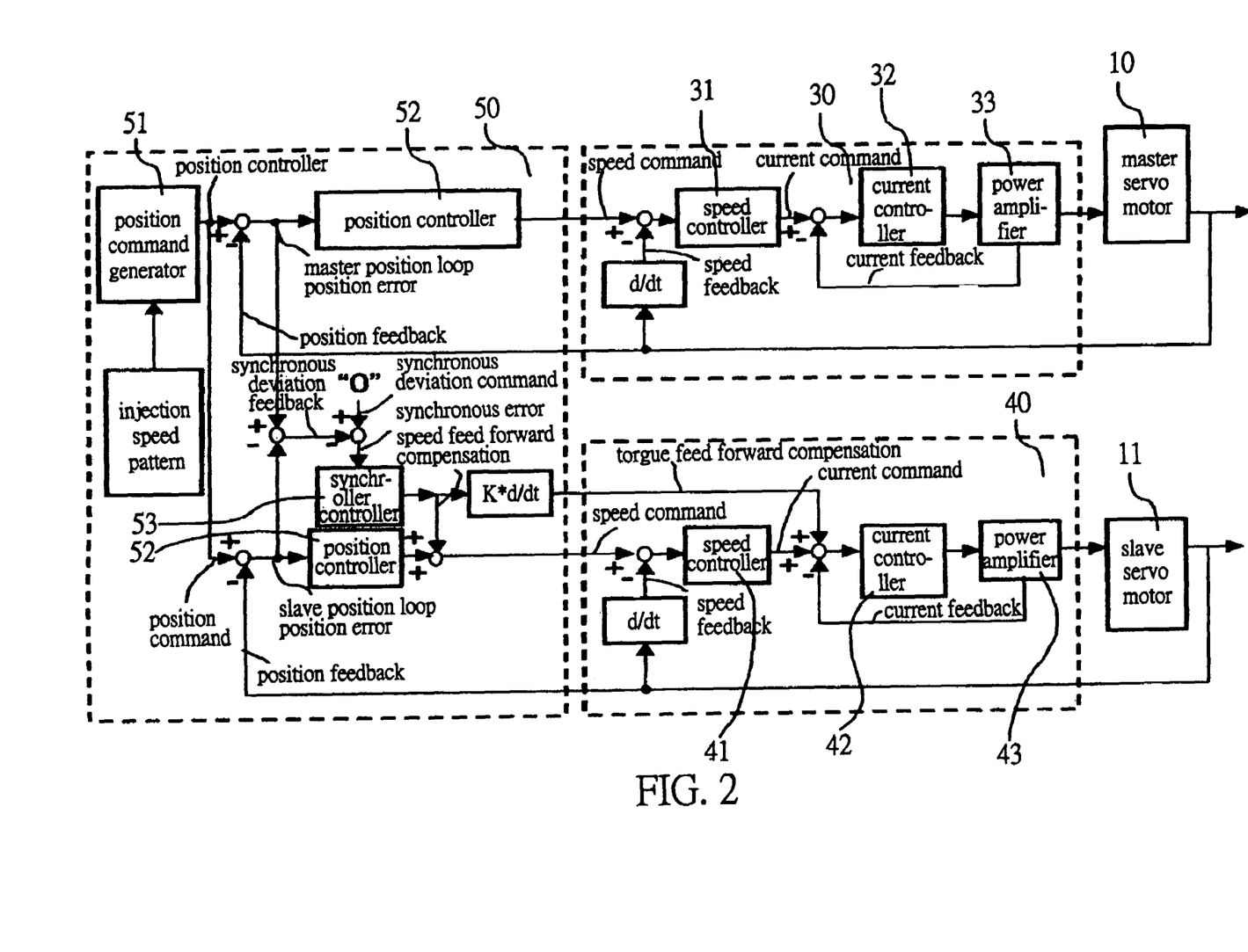
FIG. 2 is an inner function block diagram of the servo motor control apparatus of FIG. 1.

Referring to FIG. 2, an inner function block diagram of the servo motor control apparatus of the present invention is shown. Blocks enclosed in dashed line respectively represents the motion control unit 50, the first drive amplifier 30 and the second drive amplifier 40. The motion control unit 50 comprises a position command generator 51 and two position controllers 52. The position command generator 51 transmits a position command to the two position controllers 52. The two position controllers 52 respectively connect to the first drive amplifier 30 and the second drive amplifier 40 to input speed command thereto. The first drive amplifier 30 comprises a speed controller 31, a current controller 32 and a power amplifier 33 to form a first speed control loop in the first position control loop and a first current control loop in the first speed control loop. The second drive amplifier 40 also comprises a speed controller 41, a current controller 42 and a power amplifier 43 to form a second speed control loop in the second position control loop and to form a second current control loop in the second speed control loop.

Consequently, after a resin injection speed pattern of the electric injection molding machine is determined, a motion arrangement of per time unit of the injection screw 25, i.e. the position command of the control loop, is defined. The position command, which respectively subtracts the position feedback values of the first position control loop and the second position control loop (i.e. the angular positions of the master servo motor and the slave servo motor detected by a master servo motor encoder and a slave servo motor encoder), is inputted into the two position controller 52. The two position controllers 52 filter the position error to achieve speed commands to be respectively inputted into the first drive amplifier 30 and the second drive amplifier 40. The speed commands, which respectively subtract the speed feedback values of the first speed control loop and the second speed control loop (i.e. the rotation angular speed of the master servo motor and the slave servo motor achieved by performing a d/dt differential calculation on the aforementioned position feedback values), are respectively inputted into the speed controller 31, 41 of the first drive amplifier 30 and the second drive amplifier 40. The two speed controllers 31, 41 filter the speed error to achieve current commands. The current commands respectively subtract the current feedback values of the master servo motor 10 and the slave master servo motor 11 respectively achieved by the power amplifier 33, 34 to achieve current error. The current controllers 32, 42 filter the current error. The power amplifiers 33, 43 amplify the filtered current error. Thus, the feedback control is completed to respectively control the master servo motor 10 and the slave servo motor 11, further synchronously driving the injection screw 25 via the master drive mechanism 20 and the slave drive mechanism 21.

In order to achieve the synchronous operation of the master servo motor 10 and the slave servo motor 11, and to best diminish the difference of the parameters of different servo motors, the effects caused by friction and the alterations caused by new components and old ones, at least one synchronous controller 53, particularly shown in FIG. 2, is incorporated in the motion control unit 50. The feature of the servo motor control apparatus lies in that the synchronous controller 53 converts the aforementioned open loop synchronous control system into a closed loop synchronous control system. The principle of the feature is that, after the first position control loop and the second position control loop reaching an approximately uniform position via the same position command of the position command generator 51, that is, after a coarse tuning, the position error of the second position control loop is adjusted to be the same as the position error of the first position control loop via the synchronous control loop of the slave servo motor 11, wherein the synchronous control loop of the slave servo motor 11 is achieved via the synchronous controller 53, thereby adjusting the rotation angular position of the slave servo motor 11 to be uniform with that of the master servo motor 10 for achieving a fine synchronous tuning effect.

Consequently, as the inner function block diagram shown in FIG. 2, the position error of the first position control loop subtracts the position error of the second position control loop to achieve a synchronous deviation feedback value; a "0" synchronous deviation command subtracts said synchronous deviation feedback value to achieve a synchronous error; said synchronous error is inputted into the synchronous controller 53, and exerted with filtering compensation calculation; said processed synchronous error serves as the speed feed forward compensation for the second drive amplifier 40, which is inputted into the speed controller 41 to increase or decrease the rotation speed of the slave servo motor 11 for performing a real-time fine tuning for the rotation angular position, thereby keeping the synchronous status between the master servo motor 10 and the slave servo motor 11. In addition, to accelerate the synchronous response of the servo motor control apparatus of the present invention, the aforementioned speed feed forward compensation can be further performed with a K*d/dt differential calculation and inputted into the second drive amplifier 40 serving as a torque feed forward compensation, thereby performing a real-time adjusting to the torque of the slave servo motor at the beginning of the emergence of synchronous error, thereby accelerating the response speed of synchronous adjusting and adjusting the slave servo motor 11 to be synchronous with the master servo motor 10 in a very short time.

The servo motor control apparatus of the present invention is designed such that the closed loop synchronous control method thereof controls the synchronous effect of the uniform rotation speed via the cooperative operation of the motion control unit 50, the first drive amplifier 30 and the second drive amplifier 40, further achieves an accumulation effect of multiple servo motors, efficiently drives the loads, and at the same time avoids the effects caused by different parameters of the servo motors, different characters between new components and old ones, or the frictional resistance of different position of the mechanisms, and avoids inefficiency caused by the non synchronous speed of different servo motors, thereby further achieving a fast adjusting response.

The servo motor control apparatus of the present invention is not limited to employ one group slave servo motor, but can employ multiple groups of slave servo motors which respectively connect to a corresponding second drive amplifier and a corresponding synchronous controller, such that the multiple groups of slave servo motors are adjusted to be synchronous with the master servo motor, thereby achieving a desired driving effect.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A servo motor control apparatus for electric injection molding machine, comprising:
   a motion control unit, for generating a speed command;
   a first drive amplifier connected to the motion control unit, for receiving the speed command of the motion control unit to drive a first servo motor, allowing the first drive amplifier, the motion control unit and the first servo motor to cooperatively form a first position control loop; and at least one second drive amplifier connected to the motion control unit, for receiving the speed command of the motion control unit to drive at least one second servo motor, allowing the second drive amplifier, the motion control unit and said second servo motor to cooperatively form a second position control loop; wherein the motion control unit comprises at least one synchronous controller for producing a speed feed forward compensation and a torque feed forward compensation obtained from a difference between a position error of the first position control loop and a position error of the second position control loop, allowing the synchronous controller to use the speed feed forward compensation and a torque feed forward compensation to adjust the second servo motor and to keep the second servo motor synchronous in rotation speed with the first servo motor.

2. The servo motor control apparatus as claimed in claim 1, wherein the synchronous controller performs a filtering compensation calculation in terms of the difference between the position error of the first position control loop and the position error of the second position control loop, for producing the speed feed forward compensation of the second drive amplifier used for adjusting the rotation speed of the second servo motor.

3. The servo motor control apparatus as claimed in claim 2, wherein the synchronous controller is managed to perform a differential calculation to the speed feed forward compensation, for producing the torque feed forward compensation of the second drive amplifier used for adjusting a rotation angular position of the second servo motor.

4. The servo motor control apparatus as claimed in claim 1, wherein the position error of the first position control loop is obtained by subtracting a position feedback value of the first position control loop from the position commend generated by the motion control unit.

5. The servo motor control apparatus as claimed in claim 1, wherein the position error of the second position control loop is obtained by subtracting a position feedback value of the second position control loop from the position command generated by the motion control unit.

6. The servo motor control apparatus as claimed in claim 1, wherein the position command generated by the motion control unit is a predetermined motion position arrangement of an injection screw of the electric injection molding machine.

7. The servo motor control apparatus as claimed in claim 1, wherein the first drive amplifier comprises a first speed controller, a first current controller and a first power amplifier, wherein, the first speed controller is connected to the motion control unit and the first power amplifier is connected to the first servo motor.

8. The servo motor control apparatus as claimed in claim 1, wherein the second drive amplifier comprises a second speed controller, a second current controller and a second power amplifier, wherein the second speed controller is connected to the motion control unit and the second power amplifier is connected to the second servo motor.

9. The servo motor control apparatus as claimed in claim 1, wherein the first position control loop comprises a first speed control loop, and the second position control loop comprises a second speed control loop.

10. The servo motor control apparatus as claimed in claim 9, wherein the first speed control loop comprises a first current control loop, and the second speed control loop comprises a second current control loop.

11. The servo motor control apparatus as claimed in claim 1, wherein the first servo motor is used for driving a master drive ball screw of the electric injection molding machine and the second servo motor is used for driving a slave drive ball screw of the electric injection molding machine, so as to cooperatively drive the injection screw of the electric injection molding machine.

* * * * *